US011012399B1

(12) United States Patent
Sircar

(10) Patent No.: US 11,012,399 B1
(45) Date of Patent: May 18, 2021

(54) PARTIAL MESSAGE DELIVERY AND STATUS NOTIFICATION IN AN END-TO-END SECURE MESSAGING CONTEXT

(71) Applicant: BlackBerry Limited, Waterloo (CA)

(72) Inventor: Shiladitya Sircar, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/777,177

(22) Filed: Jan. 30, 2020

(51) Int. Cl.
*H04L 12/58* (2006.01)
*H04W 68/00* (2009.01)
*H04W 4/14* (2009.01)
*H04L 29/08* (2006.01)

(52) U.S. Cl.
CPC ............. *H04L 51/24* (2013.01); *H04L 51/14* (2013.01); *H04L 51/38* (2013.01); *H04L 67/26* (2013.01); *H04W 4/14* (2013.01); *H04W 68/005* (2013.01)

(58) Field of Classification Search
CPC ..... H04L 51/24; H04L 51/34; H04L 12/1863; H04L 12/1868; H04L 41/026; H04L 51/22; H04L 67/26; H04L 67/28; H04L 67/2842; H04L 67/142; H04L 51/14; H04L 51/38; H04W 4/12; H04W 68/005; H04W 4/14; G06Q 10/107
See application file for complete search history.

(56) References Cited

U.S. PATENT DOCUMENTS

| | | | |
|---|---|---|---|
| 6,100,888 A | 8/2000 | Gourdol et al. | |
| 8,634,810 B2 * | 1/2014 | Barkie | H04L 67/26 455/412.2 |
| 9,667,769 B2 | 5/2017 | Clarke et al. | |
| 10,110,548 B2 | 10/2018 | Clarke et al. | |
| 2003/0018714 A1 * | 1/2003 | Mikhailov | H04L 67/28 709/203 |
| 2007/0143417 A1 | 6/2007 | Daigle | |
| 2009/0275349 A1 * | 11/2009 | Bae | H04M 1/72427 455/466 |
| 2010/0304766 A1 * | 12/2010 | Goyal | H04L 51/34 455/466 |

(Continued)

FOREIGN PATENT DOCUMENTS

| | | | | |
|---|---|---|---|---|
| WO | WO-2013025326 A1 * | 2/2013 | ............. | H04L 51/18 |
| WO | WO-2018007568 A1 * | 1/2018 | ............. | H04W 4/12 |

*Primary Examiner* — Matthew C Sams
(74) *Attorney, Agent, or Firm* — Jenna L. Wilson; Wilson Lue LLP

(57) ABSTRACT

A system and method for determining and providing updates of message status for a message sent from a sender mobile device to a recipient mobile device includes a provider system configured to transmit notifications of messages to a recipient device using a push notification service in addition to transmitting the message to the recipient device over a distinct communication path. When a message is received from a sending device, the provider system initiates a push notification, which may be routed through a third-party service, and based on that push notification sends an initial notification of delivery to the sending device. When the recipient device acknowledges successful receipt and processing of the message, the provider system transmits a final delivery notification to the sending device. The use of the push notification service may be based on a determination of a current state of a receiving application executing on the recipient device.

20 Claims, 7 Drawing Sheets

(56) References Cited

U.S. PATENT DOCUMENTS

| | | |
|---|---|---|
| 2011/0047483 A1 | 2/2011 | Low et al. |
| 2012/0179767 A1* | 7/2012 | Clarke .................... H04L 51/34 |
| | | 709/206 |
| 2016/0028677 A1* | 1/2016 | Narasimhan ............ H04L 67/16 |
| | | 709/203 |
| 2020/0382916 A1* | 12/2020 | Lynch ................. H04W 68/005 |

* cited by examiner

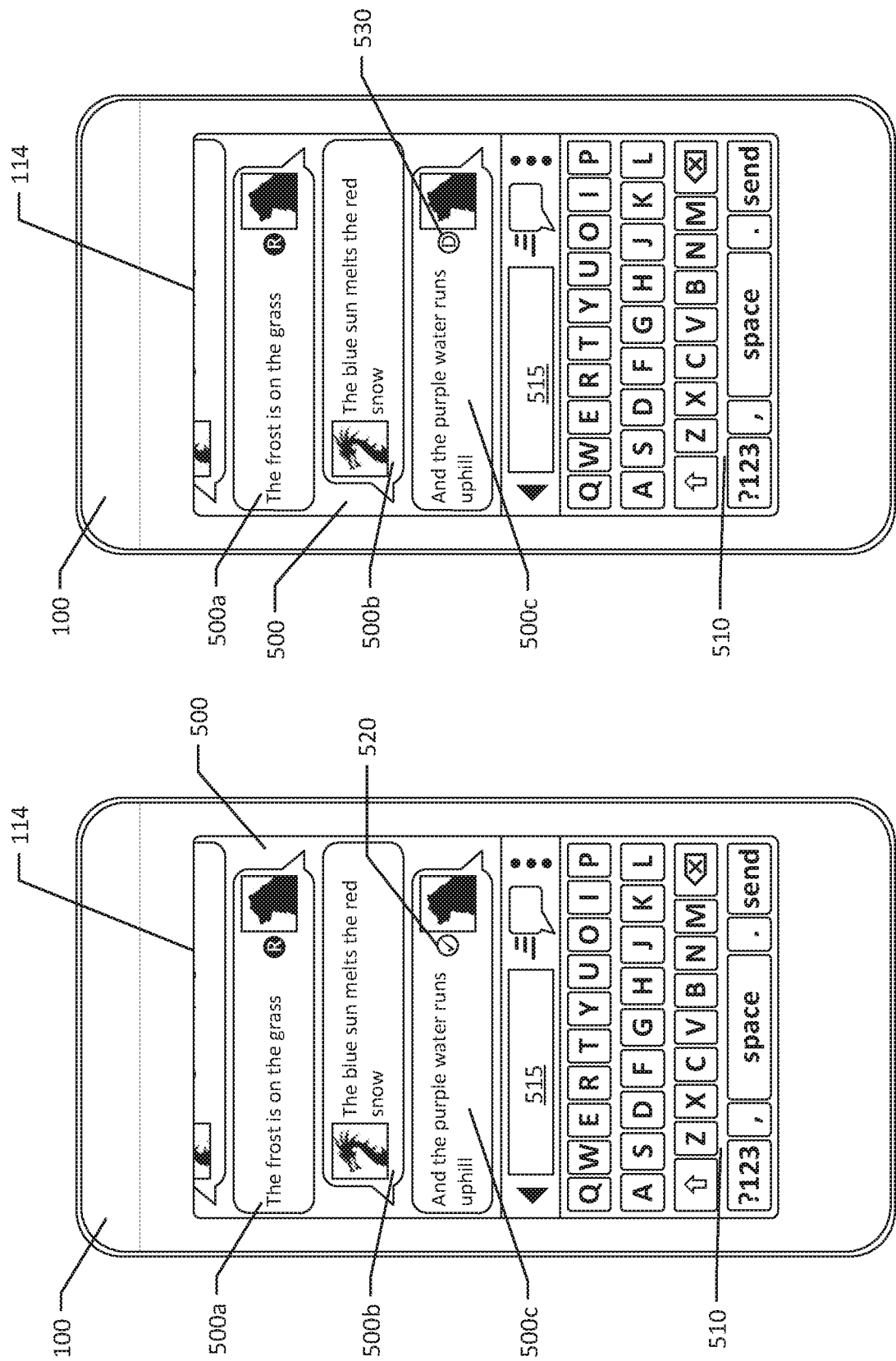

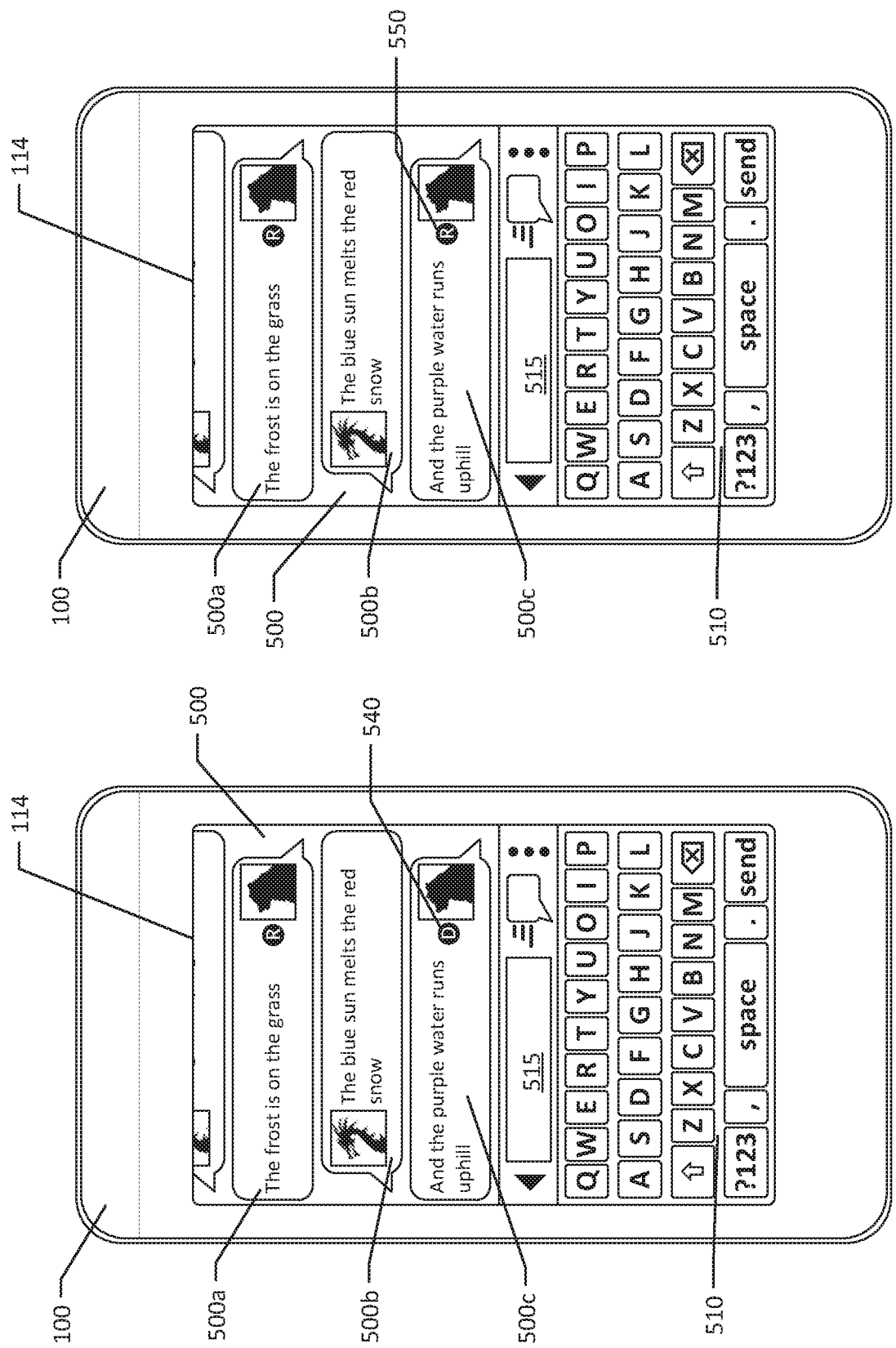

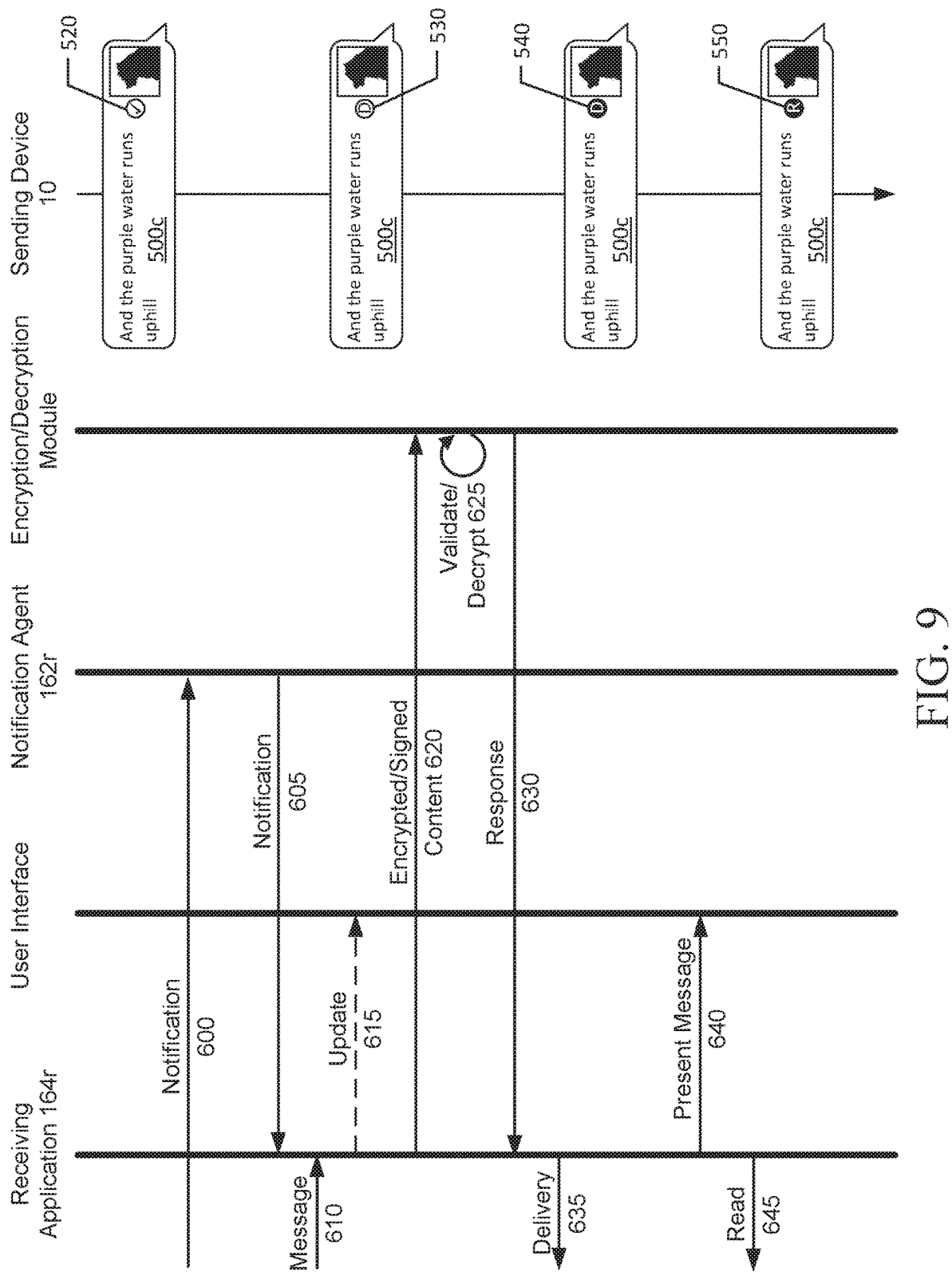

PARTIAL MESSAGE DELIVERY AND STATUS NOTIFICATION IN AN END-TO-END SECURE MESSAGING CONTEXT

BACKGROUND

1. Technical Field

The present disclosure is generally directed to transmission of messages and other data to data consuming applications, such as messaging applications, executing on communication devices, and in particular to routing of status and message data between sending and receiving devices.

2. Description of the Related Art

Messaging between users of mobile communication devices typically lack context of in-person conversations—a feature which may be desirable or an inconvenience, depending on the preferences of the participants in a messaging session. Because the sender in a messaging session cannot know whether the recipient, who may be physically located elsewhere, has received or read a message, messaging services sometimes provide delivery and read notification functionality that enables a sender to know when a message has been sent to a recipient's mobile communication device (or successfully received by the device), and optionally when a message was actually displayed by the messaging application executing on the recipient's device.

However, timely updates of the status of the message at the recipient's mobile communication device—whether it has been received, and whether it has been read creates a burden on the messaging infrastructure and on the recipient's device, since multiple notifications must be exchanged between the messaging service and the sender's device, and the messaging service and the recipient's device. Furthermore, the ability to send timely updates may be impeded by security policies implemented on a recipient's device, which may hamper the ability of a messaging application executing in the background to maintain an open communication channel with the messaging service to receive a message, process the message, and to return a receipt acknowledgment.

BRIEF DESCRIPTION OF THE DRAWINGS

In drawings which illustrate by way of example only embodiments of the present application.

FIG. 5 is an illustration of a possible user interface depicting a first message transmission or delivery state on a sending mobile communication device.

FIG. 6 is an illustration of a further possible user interface depicting a second message transmission or delivery state on the sending mobile communication device.

FIG. 7 is an illustration of a further possible user interface depicting a third message transmission or delivery state on the sending mobile communication device.

FIG. 8 is an illustration of a further possible user interface depicting a fourth message transmission or delivery state on the sending mobile communication device.

FIG. 9 is an interaction diagram illustrating processing of received data on a receiving mobile communication device, correlated to the depicted state on the sending mobile communication device.

DETAILED DESCRIPTION

Figure 1:
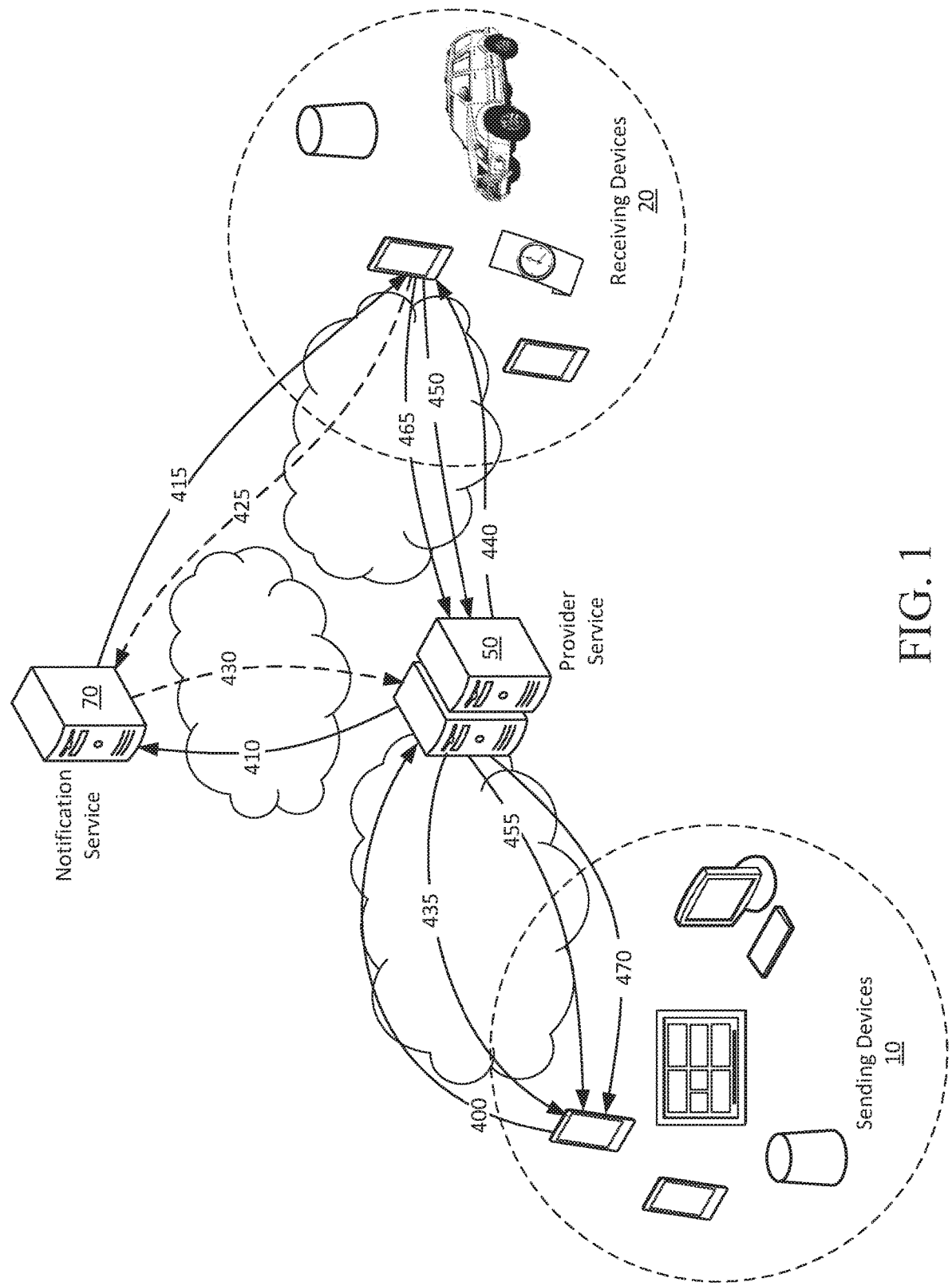
FIG. 1 is a schematic of an example data communication network for implementing the embodiments discussed herein.

With improvements in the speed and bandwidth of data communication network and processing power, users of mobile communication devices such as smartphones, tablets, smart wearable devices, and the like, have developed expectations for speedy transmission of data and responsive applications that launch quickly. However, concerns for user privacy, security, processor performance, and battery life have led manufacturers of mobile device platforms to limit the ability of applications collect or process data while executing in the background, for example by limiting execution time in the background, or by preventing applications from maintaining network connections while executing in the background. These measures are typically implemented from concerns that a malicious (or even well-meaning) application developer may be collecting data in the background without the user's knowledge, or that hidden processes or connections will interfere with applications executing in the foreground and/or consume battery life.

On the other hand, these privacy and resource protection measures interfere with user expectation for immediate feedback in electronic communications, particularly in the context of data consuming applications on mobile devices, which are expected to passively receive and process data in the background over the wireless network, even when the user is not engaged with the application (i.e., when the application is executing in the background). This problem is best illustrated by messaging and social media applications. Users of such applications expect data for these applications, such as messages, updates, and posts (collectively referred to as "messages"), to be pushed to their mobile devices even when the applications are not executing. In addition, some messaging services, and possibly social media platforms, sometimes provide delivery and read notification functionality that enables a sender or publisher of a message to know when the message has been sent to a recipient's mobile communication device, and when it was actually consumed by the recipient. Implementation of delivery notification functionality requires that the data consuming application at the recipient device be able to receive and process the message, then transmit an acknowledgment back to the service provider that the message was received once it was successfully processed.

Senders of messages have come to expect near-instantaneous feedback regarding the success of their messages, in the form of delivery notifications confirming receipt of their message by a recipient device (e.g., within seconds of sending a message to the recipient). This is generally feasible when messages are sent in the clear, e.g., without end-to-end encryption in which the sender's message is encrypted prior to transmission from the sender's device and is only decrypted once received by the recipient's device, as the processing steps required at the recipient's device prior to acknowledging delivery of the message may be trivial. Processing may comprise a simple validation step to ensure the message was not corrupted during transit, for example. Upon receiving a new message, the data consuming application may be launched in the background, if it is not already executing in the background, on the receiving device to process the incoming message and send the acknowledgment of receipt to the service provider within the limited time permitted for execution of background processes.

However, when the processing step is more resource or time-intensive, as in the case of end-to-end encryption of messages, the data consuming application may not be able to have sufficient time allocated to it to complete the necessary decryption tasks. Each conversation or thread of messages may be encrypted with a different set of keys, based on the participants in the conversation, and each individual message in a conversation may be encrypted by a distinct derived key, based in part on the sequence of messages in the conversation. This means that to be able to acknowledge receipt of an encrypted message, the data consuming application must retrieve the correct key from a key store, sequence the received message in the conversation, compute the derived key, and decrypt the message. The policies implemented on the recipient mobile device, however, may not permit sufficient background execution time to be allocated to the application to complete these steps; possibly, these steps may only be carried out when the data consuming application is executing in the foreground, i.e., when the user of the recipient mobile device is actually engaged with the application. As the user may be away from their device when the message was initially sent, and may not use the application for some time, the delivery notification to the sender of the message will be delayed, despite the fact that the recipient's device had actually received the data (albeit in encrypted form). Furthermore, if the processing steps can only be completed when the application is executing in the foreground, the delivery notification will likely be meaningless, as the user of the recipient device will likely be reading the message at that time—so the delivery notification may be very quickly followed, or superseded, by a notification that the message had been read. The delay in the delivery notification creates uncertainty for the sender of the message, who may resort to re-sending the message, or sending the information via a different protocol or messaging application, to in an attempt to ensure the message is received by the recipient's device. This naturally results in a waste of resources. Similar concerns may arise for any computationally intense process, such as verifying the status of a digital certificate and computing a digital signature.

Accordingly, the embodiments and examples described herein provide a method, device, system, and non-transitory medium providing improvements in the determination and delivery of status information of messages sent from a sending device to a recipient device. In particular, when a message for delivery to a recipient device is received by a provider system (e.g., a messaging service provider), an initial notification of the new message is delegated to a push notification service, with at least partial content relating to the message being sent to the recipient device in a push notification. This is followed by complete delivery of the message, and processing of the message, by the recipient device. An initial delivery notification is transmitted to the sending device based on the initial push notification, and a final delivery notification is transmitted to the sending device once the receiving device acknowledges successful delivery of the message.

These embodiments and examples may be implemented in a data communication network such as that shown in FIG. 1, which schematically illustrates a simple network topology for communicating between sending communication devices 10 and receiving communication devices 20. The network includes a provider service system 50 and a notification service system 70. Configuration of the provider service system 50 and the notification service system 70, including processors, memory, persistent storage, network communication interfaces and subsystems, and the like, will be understood by those skilled in the art from the embodiments and examples discussed herein. It will be appreciated by those skilled in the art that a number of components, such as wireless networks and gateways and the like, are omitted simply for clarity of presentation. The receiving communication devices 20, and optionally the sending communication devices 10, may be configured like the mobile communication device 100 discussed with reference to FIG. 2 below. Data is communicated among various nodes of the network suitable wired or wireless infrastructure, for example one implementing public data networks and/or public switched telephone networks. Communications between the sending and receiving devices 10, 20 and other network nodes may take place at least in part over public networks, including but not limited to the Internet. Communications between the provider service system 50 and the notification service system 70 may also take place at least in part over a public network, but may in some cases take place over a private network, for example where the provider service and notification service are operated by the same entity.

Figure 2:
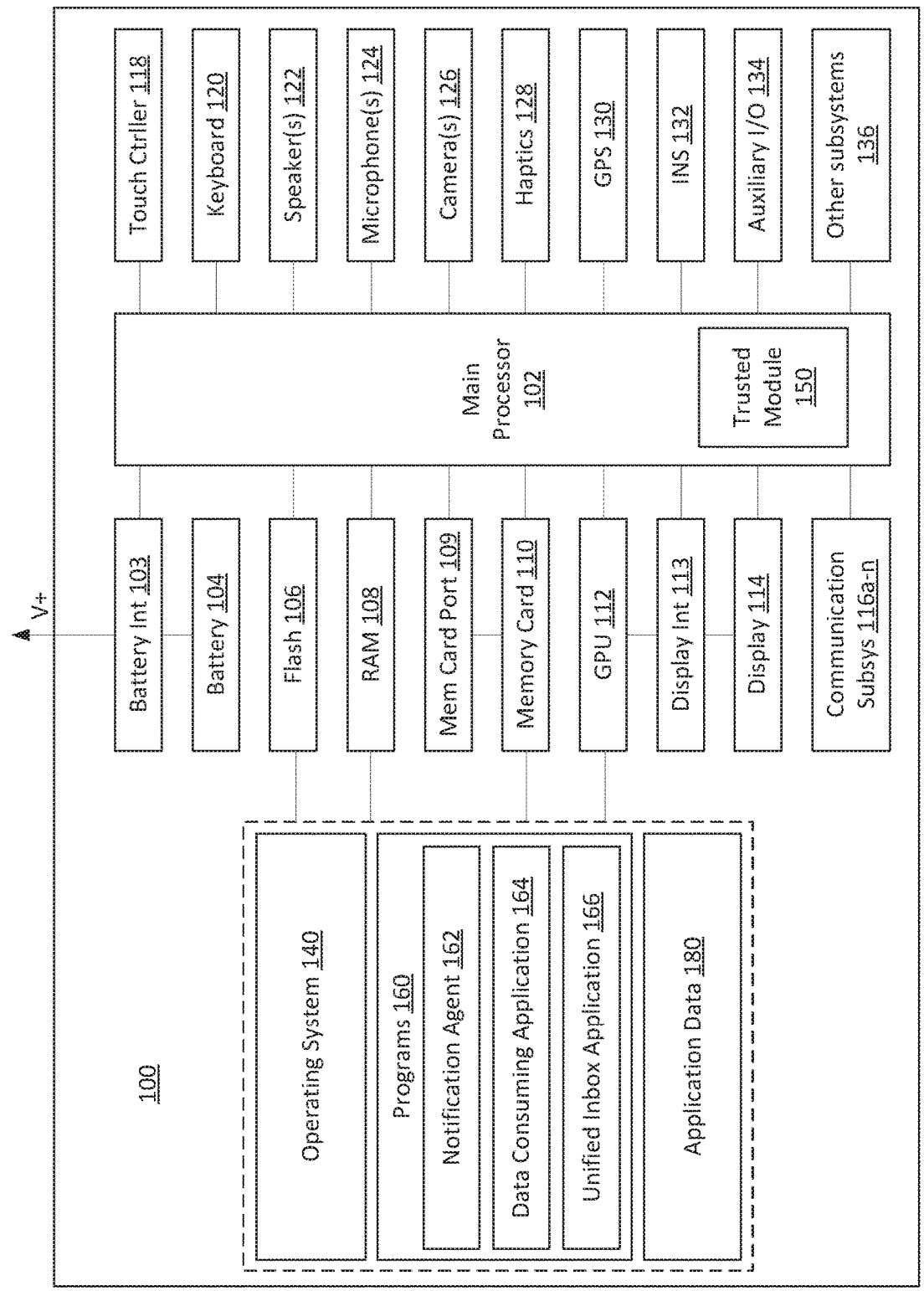
FIG. 2 is a block diagram of an example mobile communication device for use in the data communication network of FIG. 1.

It will be appreciated by those skilled in the art that embodiments and examples described herein may be implemented using a variety of user communication devices, including without limitation smartphones, wearable communication devices such as smart watches, wireless organizers, personal digital assistants, desktop computers, terminals, laptops, tablets, handheld wireless communication devices, notebook computers, gaming and entertainment devices, and the like. Unless expressly stated, a computing or communication device may include any such device. FIG. 2 illustrates components of an example mobile communication device that may employed. Operation of the device 100 is generally controlled by a main processor or processors 102. In some implementations, the processor includes a trusted execution zone and/or storage 150, which may be used to store encryption keys (i.e., a key store) and execute encryption/decryption algorithms and other code requiring a secure execution space. The device 100 may be a battery-powered device and would thus include an interface 103 that may connect to one or more rechargeable batteries 104, and/or may include an adaptor for receiving and converting mains power to power the device and/or charge or recharge the battery 104. Data can be stored in flash memory 106, random access memory (RAM) 108, or other storage elements such as a memory card 110 received in an integrated memory card port 109. Typically, software and data components such as the OS 140, applications 160, and application/user data 180 are stored in resident persistent memory such as the flash memory 106, and some components of the OS 140 may be embedded as firmware in integrated memory in the processor 102. However, portions of such components may be temporarily loaded into a volatile store such as the RAM 106.

Communication functions, including data and optionally voice communications, are performed through one or more communication subsystems 116$a$-$n$ in communication with the processor 102. Other functional components used to accomplish communication functions, such as antennae, decoders, oscillators, digital signal processors, and the like, may be considered to be part of these subsystems. Wireless communication subsystems 116a-n are used to exchange data with wireless networks or other wireless devices in accordance with one or more wireless communications standards. New wireless standards are still being defined, but it is believed that they will have similarities to any network or communication behavior described herein, and the examples described here are intended to be used with any suitable standards that are developed in the future. The wireless link connecting the communication subsystems 116a-n may operate over one or more different radiofrequency (RF) channels according to defined protocols, such as wireless LAN (e.g., one or more of the 802.11™ family of standards), near-field communication, Bluetooth® and the like. The particular design of a communication subsystem is dependent on the communication network with which it is intended to operate.

The device 100 is provided with at least a display output interface 113 that connects to a display screen 114, which is either integrated into the device 100 (particularly if the device 100 is intended to be mobile or portable) or external to the device 100. Graphics data to be delivered to the display screen 114 via the interface 113 is either processed by the main processor 102, or optionally by a separate graphics processing unit (GPU) 112. In some examples, the electronic device is a touchscreen-based device in which a combination display screen-touch interface is a primary user interface mechanism, communicating information and presenting graphical user interfaces to the user while also receiving user input that may be converted into instructions for execution by the device 100. In such cases, the display screen 114 may comprise a touchscreen digitizer layered on the actual display component (e.g. liquid crystal display) of the display screen 114, in communication with a touchscreen controller 118 that processes detected touches and gestures on the touchscreen. The construction and operation of a suitable display screen and/or touchscreen interface will be understood by those skilled in the art. In some implementations, the device 100 is configured to output data to an external monitor or panel, tablet, television screen, projector, or virtual retinal display, via a data port or transmitter, such as a Bluetooth® transceiver, USB port, HDMI port, DVI port, and the like. Generally, as referred to herein, "display", "display screen", and "display interface" are intended to encompass all implementations with integrated and external display screens unless expressly or implicitly stated otherwise.

The processor 102 also interacts with additional subsystems, if present. This can include I/O devices, sensors, and other components such as a keyboard 120, speaker(s) 122, microphone(s) 124, camera(s) 126, haptics module 128 (e.g., a driver and a vibratory component, such as a motor), GPS or other location tracking module 130, other auxiliary I/O ports 134, and other subsystems 136. Other I/O subsystems can include pointing devices or touch devices such as trackballs, IR fingerprint detectors, roller wheels, optical joysticks, and trackpads. The device 100 may also be provided with an orientation or inertial navigation sensor 132 such as one or more accelerometers, used to detect the orientation of the device 100. Not all of these subsystems are required, and many may be omitted. For instance, where the primary user interface is a touchscreen, a physical keyboard may be omitted altogether. Some subsystems may be provided instead as peripheral devices that connect to the device 100 using a data port or transmitter.

While the example device 100 is a wireless communication device and may be referred to herein as a "handheld" or "mobile" device, it will be appreciated by those skilled in the art that this description is not intended to limit the scope of the described embodiments to implementation on devices with a specific form factor or devices that are intended primarily or solely for communication or productivity. The examples herein may be applied to any appropriate data processing device adapted to communicate over a fixed or wireless connection, whether or not the device is portable or wirelessly enabled, whether or not provided with voice communication capabilities, and regardless of its primary intended usage, such as productivity or entertainment.

Among the programs 160 provisioned on the device 100, there may be a notification agent 162, which as discussed below receives push notifications from the notification service system 70 and invokes the appropriate handlers or objects in corresponding applications installed on the device 100 for processing the notifications. There may also be one or more data consuming applications 164, such as messaging applications associated with one or more messaging accounts employing one or more different messaging formats or types. In the embodiments discussed below, a messaging application is used as the example data consuming application 164. Formats or types of messages handled by a messaging application can include social media messages or notifications; email; Short Message Service (SMS); Instant Messaging (IM); Multimedia Messaging Service (MMS); Visual Voicemail (VVM); PIN-based or direct messages (DM), that is to say, text and/or multimedia messages addressed using an alternate identifier, such as a proprietary address or hardware identifier; and calendar and task events (if not transmitted as attachments to other messages). The formatting and transmission of all such messages, storage and indexing of such messages, and the implementation of suitable messaging infrastructures and standards to support all of these example communications will also be known to those in the art. For example, email messages and services may be constructed and implemented in accordance with known Internet messaging standards including Internet Message Format RFC 5322 and RFC 2822, published by the Internet Engineering Task Force, as well as their predecessor, successor, and companion standards. IM messages include network-based and peer-to-peer messages, and such messages and services may be defined in accordance with known standards such as RFC 2779 and RFC 3921 also published by the Internet Engineering Task Force, and their companion, predecessor and successor standards. Point-to-point SMS messages may be implemented in accordance with 3GPP ($3^{rd}$ Generation Partnership Product) Technical Specification 03.40, and optionally extended for transmission of MMS messages as specified by the Open Mobile Alliance Multimedia Messaging Service V1.3, and their companion, predecessor and successor standards. Regardless, all such messages and services intended for use with the within embodiments may also or alternatively be defined in accordance with proprietary standards and protocols. Messages may be defined, formatted, and presented using messaging applications implemented on user devices such as the device 100 described above. Messages are typically identifiable by a unique or quasi-unique handle or identifier (ID), implemented within the message format in a suitable location, for example in a header of the message. Some message formats may not include a header distinct from the body in the manner of an email format, but may nevertheless comprise content in a payload portion in addition to metadata.

Some message types permit messages to be interrelated, for example by cross-referencing identifiers, thread identifiers, subject line, or other common data comprised in the messages. Whether interrelated or not, messages exchanged between a given set of participants (senders and recipients, or originating and recipient or destination devices) may be presented by messaging applications in a conversational paradigm, chronological order, or reverse chronological order, or in any other suitable presentation form or order. An example of such a presentation form is presentation in a "conversation" or "threaded" mode, in which messages identified as belonging to a common thread are presented as a group. In some implementations, the mobile communication device 100 may also include a unified inbox application 166, which is configured to retrieve and display a plurality of types or formats of messages (e.g., IM, SMS and email) and/or messages from a plurality of accounts of the same type (e.g., multiple email accounts) in a single user interface.

In the examples below, for simplicity it is presumed that the sending device 10 and the receiving device 20 are similarly configured; for example, both may be mobile communication devices 100 as described above. Both devices 10, 20 are provisioned with a messaging application in this example. The messaging application (indicated as sending application 164s and receiving application 164r in FIGS. 3 and 4) is configured to communicate with the provider service system 50, which in this example is a messaging service. The sending and receiving applications 164s, 164r are configured to receive and process notifications from the notification agent (indicated as sending device notification agent 162s and receiving device notification agent 162r). The notification agents 162s, 162r are configured to receive notifications from a notification service system 70. As mentioned above, the notification service may or may not be operated by the same operator as the provider service system 50. In some implementations, the notification service system 70 may be a notification platform from a provider of a mobile device operating system, such as the Apple Push Notification service (APNs), a notification service platform provided by Apple Inc., Cupertino, Calif., USA; or Firebase Cloud Messaging, a notification service platform provided by a subsidiary of Alphabet Inc., Mountain View, Calif., USA. Other examples of notification service platforms include Windows Push Notification Services (WNS), from Microsoft Corporation, Redmond, Wash., USA, or Baidu Cloud Push, provided by Baidu, Inc, Beijing, CN. The notification agent 162r, 162s may be provisioned on the mobile device 20, 10 at the same time as the operating system 140, or provisioned and/or updated separately.

So that the messaging applications 164s, 164r are able to receive notifications from the notification agent 162s, 162r, the provider of the messaging service (provider service system 50) registers with the notification service and obtains any application programming interface (API) keys and other credentials as may be necessary to be able to initiate push notifications. When each messaging application 164s, 164r is installed on its respective device 10, 20, it is presumed that any user permission to receive notifications is granted and the messaging application 164s, 164r registers for push notifications with the notification agent 162s, 162r on its respective device and with the notification service 70. The messaging application 164s, 164r receives a device token, which identifies the application on its particular device, and which serves as an "address" for the notification service 70 to be able to identify the device and application as an endpoint. The messaging application 164s, 164r also transmits the device token to the provider service system 50, which stores the token in association with any other identifier that the provider service system 50 employs for routing messages to a recipient. The identifier may be a PIN or a different address identifier, such as a telephone number, email address, etc. Generally, the onboarding of a service provider system 50 with a third party notification service 70, and the configuration of a mobile device application to receive server push notifications, will be understood by those skilled in the art.

Figure 3:
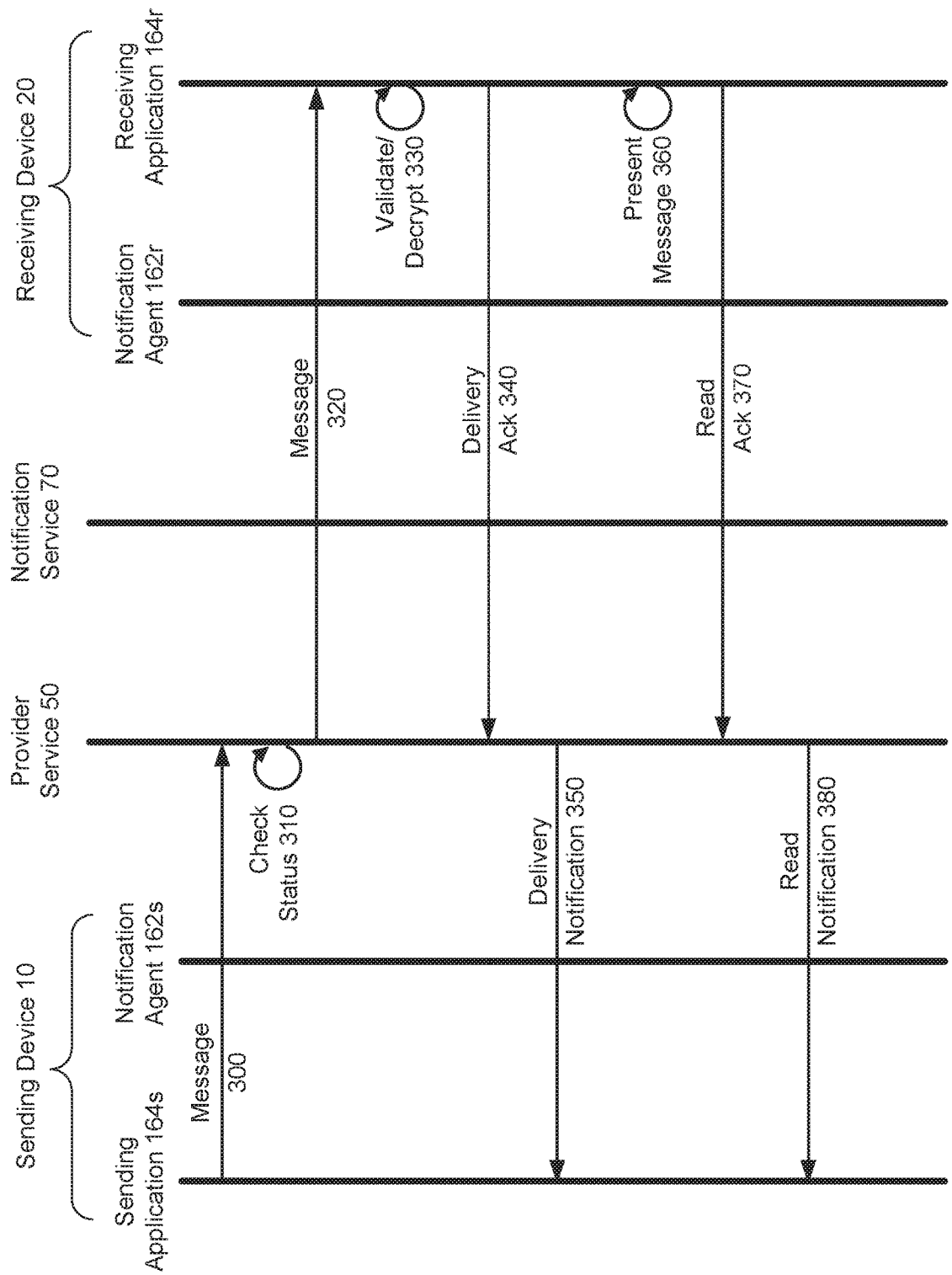
FIG. 3 is a communication diagram illustrating communications between a sending mobile communication device, receiving mobile communication device, a provider service system and a notification service system.

With the sending and receiving devices 10, 20 and the provider service system 50 appropriately configured, FIG. 3 illustrates a process for determining the status of a message sent from the sending mobile communication device 10 to the receiving mobile communication device 20, and for transmitting status updates to the sending device. The process starts with a user of the sending device 10 transmitting a message or other data 300 for consumption by the user of the receiving device 20. This message can include a payload—which may be encrypted, in the case of an end-to-end encrypted messaging service—a destination address or identifier for the recipient that is employed by the provider service system 50 to identify the receiving device 20, and any other information that may be required by the provider service 50. For example, the sending device 10 may also generate and include a message ID value, which is used by the provider service 50 to identify the message in later communications. Alternatively, the provider service 50 may compute the message ID only once it receives the message, and provide this ID to the sending device 10 as part of an acknowledgment (not shown in FIG. 3 or 4).

When the message is received by the provider service 50, the provider service 50 may optionally store the message in persistent storage in association with the message ID, and identifiers for the sender and recipient. In other implementations, the message content is not actually stored, and only the identifiers are stored so that the provider service 50 can provide status updates to the sender. Optionally the provider service 50 checks the current status 310 of the receiving application 164r on the recipient device to determine whether or not a delivery acknowledgment can be obtained from the receiving application 164r promptly. For example, if the receiving application 164r is not executing in the foreground, meaning that the user is not currently engaging with the application 164r, as discussed above this may mean that the application 164r may not be able to complete any required processing of the message in a background process to be able to return a delivery acknowledgment. The current status of the receiving application 164r may be determined from receipt of a "heartbeat" or periodic ping or signal that is transmitted by the application 164r to the provider service 50 (not shown in FIG. 3 or 4) whenever it is executing in the foreground and has a network connection. If a determination is made that a delivery acknowledgment cannot be received promptly, then a process such as that described with reference to FIG. 4 may be followed. If, on the other hand, the provider service 50 has received a heartbeat signal relatively recently—for example, within 10 or 30 seconds of the current time—the provider service 50 may determine that the application 164r will be able to receive and process the message. In that case, as shown in FIG. 3, the provider service 50 transmits the message 320 to the receiving device 20, where it is received by the receiving application 164r.

After receiving the message at 320, the receiving application 164r executes any required processing on the message 330. This may include verifying the content of the message, such as verifying a digital signature, or decrypting the message, as discussed above. Once this is completed, the receiving application 164r transmits to the provider service 50 a delivery acknowledgment 340. As the message 320 would have been transmitted with the message ID, the delivery acknowledgment 340 would likewise include the message ID so that the provider service 50 can correlate the acknowledgment 340 with the message. The provider service 50 then transmits a delivery notification message 350 to the sending application 164s on the sending device 10, which can then update the user of the sending device as to the status of the message, i.e., that it had been successfully delivered to the recipient.

If the provider service 50 also supports read notifications, indicating that the recipient has read or consumed the content of the message (or at least, that the message had been presented to the user of the receiving device 10, if not actually consumed or understood by the user), then after the message has been presented 360 on the receiving device 20, for example in a graphical user interface of the receiving application 164r, the receiving application 164r transmits to the provider service 50 a read acknowledgment message 370 with the message ID. The provider service 50 can then generate and transmit a read notification 380 to the sending application 164s, which can then update the user of the sending device 10 as to the status of the message at the receiving device 20.

It should be noted that the determination at 310 may be based on data other than a heartbeat signal transmitted by the application 164r. For example, the policy that restricts execution of applications in the background may be implemented only in certain device operating systems. Therefore, if the provider service 50 also stores information about the receiving device platform 20 (e.g., device model, operating system type and version), the provider service 50 may determine based on this information whether or not to follow the process of FIG. 3 or FIG. 4, i.e., whether a delivery acknowledgment may be received from the application 164r promptly. Furthermore, the determination at 310 may be omitted altogether, and all messages may be handled in accordance with FIG. 4 without the step of checking status (405 in FIG. 4).

Figure 4:
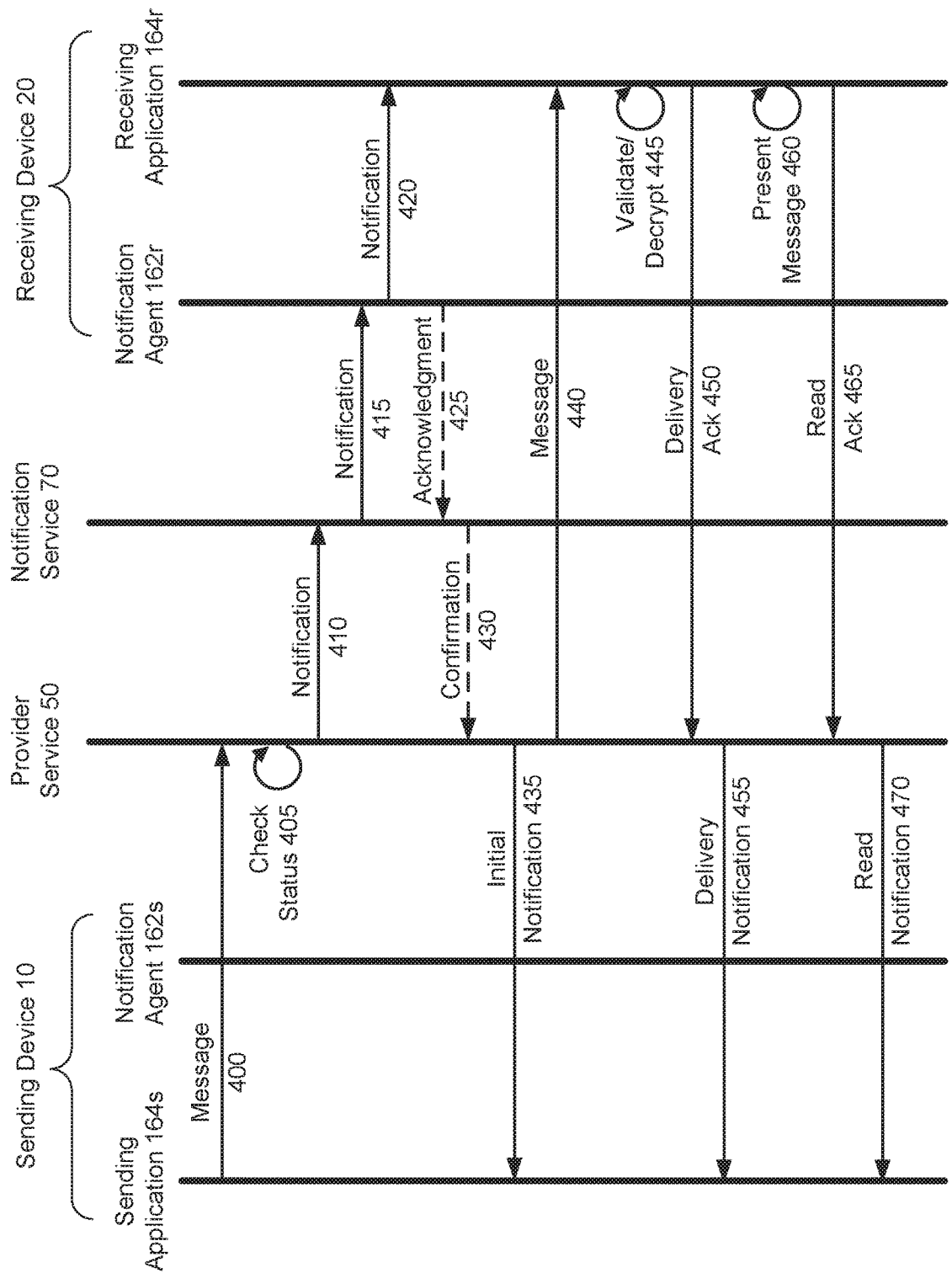
FIG. 4 is a further communication diagram illustrating communications between the devices and systems depicted in FIG. 3.

Turning now to FIG. 4, a process is shown for determining the status of a message sent from the sending mobile communication device 10 to the receiving mobile communication device 20 when the receiving device 20 is not expected to send a prompt delivery acknowledgment. Various steps in this process are also indicated in interactions depicted in FIG. 1. The process begins in a manner similar to that of FIG. 3, in that the sending device 10 transmits a message or other data 400 for consumption by the user of the receiving device 20. The message 400 may be configured as described above, and may include an encrypted payload. When the message is received by the provider service 50, the provider service 50 may optionally store the message in persistent storage in association with the message ID, and identifiers for the sender and recipient, or only store the identifiers without the message content. At 405, the provider service checks the current status 310 of the receiving application 164r on the recipient device to determine whether or not a delivery acknowledgment can be obtained from the receiving application 164r promptly, for example using the heartbeat signal or device platform information discussed above. In this case, it is assumed that a delivery acknowledgment is not obtainable promptly from the receiving application 164r.

Accordingly, the provider service 50 transmits a request 410 to the notification service 70 to send a push notification to the receiving device 20. The request may comprise an API call including a small payload, such as notification content, and user interface alert information (e.g., whether a sound should be triggered on the receiving device, or a different kind of notification), the recipient device token, and any required credentials. Typically, a notification only contains a few kilobytes of information, and may not be able to carry the entire message content. Therefore, the notification content may comprise at least the message ID. The notification service 70 receives this request, and generates and transmits a notification 415 for receipt by the notification agent 162r on the receiving device 20. The notification agent 162r invokes the appropriate handler 420 associated with the receiving application 164r to process the incoming notification in the background (or foreground, if the application 164r is currently executing in the foreground), providing the receiving application 164r with at least the message ID.

The receiving application 164r may be configured to display a local notification on the device to advise the user of an incoming message, even if the actual message had not yet been received. In some implementations, however, the notification is actually a "silent" push that does not trigger a user notification on the receiving device 20. Instead, the notification 420 triggers the receiving application 164r to wake up and perform another task in the background, such as downloading the message from the provider service 50, whether or not it is able to completely process the message (e.g., by decrypting it) in the background.

Optionally, the notification agent 162r, after receiving the push notification 415, may transmit an acknowledgment 425 to the notification service 70 to confirm that the push notification was received. The notification service 70 may then transmit a confirmation message 430 to the provider service 50, confirming that the push notification was successfully sent and received. Based on this, the provider service 50 generates and transmits to the sending device 10 an initial or provisional delivery notification 435, signifying that the recipient device 20 had at least been notified of the message 400, even if it had not yet been completely received and processed.

In the meantime, the message is transmitted 440 by the provider service 50 to the receiving application 164r. In fact, the transmission of the message may occur more or less concurrently with the initial notification 410, 415, or even before the initial notification 410, 415. In some implementations, the initial delivery notification 435 is transmitted by the provider service 50 to the sending application 164s once the push notification 415 has been triggered and the message 440 has been transmitted to the device; thus, the initial delivery notification 435 indicates that the recipient device 20 has received the message and the user has been notified, even though the message has not been completely processed.

When the receiving application 164r is able to process the message 445 as required, as described above (e.g., decrypting the contents), the receiving application 164r transmits a delivery acknowledgment 450 to the provider service 50. The provider service 50 may then transmit a final delivery notification message 455 to the sending application 164s on the sending device 10, which can then update the user of the sending device as to the status of the message, i.e., that it had been successfully delivered to the recipient. This update would replace a previous status provided to the user of the sending device 10 based on the initial delivery notification message 435.

Again, if the provider service 50 also supports read notifications, then after the message has been presented 460 on the receiving device 20, the receiving application 164r transmits to the provider service 50 a read acknowledgment message 465 with the message ID. The provider service 50 can then generate and transmit a read notification 470 to the sending application 164s, which can further update the user of the sending device 10 as to the status of the message at the receiving device 20.

FIGS. 5 to 8 illustrate possible graphical user interfaces in a messaging application, such as a SMS or instant message application, executing on the on a mobile communication device 100 in response to the known state of the corresponding mobile communication device to which a message was sent, such as in the process of FIG. 4. In these examples, a graphical user interface 500 for a single conversation or thread of messages is presented on the display 114 of the mobile communication device 100. As messages in an SMS or instant message context tend to be brief, it is possible that multiple messages between participants (i.e., the user of the mobile communication device 100, and the recipient of the messages sent by the user) can be displayed at once in the graphical user interface 500 in chronological order, with the most recent message in the conversation displayed at the bottom. Thus, in this example, messages 500a, 500b, and 500c are displayed, with messages 500a and 500c being transmitted from the mobile communication device 100 and message 500b received from the other participant by the mobile communication device 100. Message 500c is the most recently transmitted from the mobile communication device 100. These example graphical user interfaces also include user input fields and graphical elements 515 and a virtual keyboard 510. Implementation of these features will be understood by those skilled in the art.

In the example of FIG. 5, the user of the mobile communication device 100 has just authored and sent using the messaging application the message 500c to the provider service 50 for routing to the recipient. The provider service 50, on successfully receiving the message, may transmit an acknowledgment to the messaging application executing on the mobile communication device 100, and optionally the messaging application may be configured to augment the display of the message 500c to indicate to the user that the message was successfully sent to the provider service 50. In this example, a graphical element in the form of a check mark badge 520 is displayed coincident with the message 500c in the graphical user interface, although of course alternative graphical indicators may be employed to illustrate this status in the graphical user interface 500. In some implementations, the messaging application may not display a badge; for example, the messaging application may instead display a timestamp for the message (e.g., the time the message as acknowledged received by the provider server 509, or the time the message was transmitted from the mobile communication device 100) with the message 500c. Alternatively, the messaging application may display nothing at all, and only display an alert to the user if it determines that the message was not successfully received from the provider service 50.

Once the provider service 50 has determined that the initial notification has been sent—for example, once the provider service 50 has successfully transmitted the request for a push notification 410 to the notification service 70 as described with reference to FIG. 4, or alternatively after having received an acknowledgment from the notification service 70 of the request 410, or after having received a confirmation 430 that the notification was successfully received by the messaging application on the receiving mobile communication device—and has transmitted the initial delivery notification 435 to the messaging application on the mobile communication device 100, the messaging application alters the display of the message 500c in the graphical user interface 500 to reflect that the recipient's mobile communication device has been notified of the message. In the example of FIG. 6, the previous graphical element is replaced by an initial delivery badge 530.

Subsequently, once the entire message has been successfully received and processed by the recipient's mobile communication device and the provider service 50 has received a confirmation of successful delivery, the provider service 50 sends a final delivery notification 455 as shown in FIG. 4. On receipt of this final delivery notification by the messaging application executing on the mobile communication device 100, as shown in FIG. 7, the messaging application further alters the display of the message 500c in the graphical user interface 500 to reflect the updated status at the recipient's mobile communication device. In this example, the messaging application replaces the previously displayed graphical element with a new, final delivery badge 540. In the examples of FIGS. 6 and 7, the distinction between the initial and final delivery graphical elements is simply one of color; both graphical elements 530, 540 include a "D" to denote "delivered". In other implementations, the initial delivery graphical element may denote that the message has been successfully dispatched to the recipient, or that the recipient has been notified. If the provider service offers end-to-end encryption, the final delivery graphical element may indicate to the user of the mobile communication device 100 that the message has been successfully decrypted at the recipient's device. Thus, for example, the initial delivery graphical element may comprise a badge with an "N" for "notified" and the final delivery graphical element may comprise a badge with a "D" for "decrypted". Of course, it is not necessary that any graphical indicator of the status of the message at the recipient's device comprise letters or text. In another implementation, for example, the progress in the status of the message at the recipient's device may be depicted by a progress bar or other progress indicia, where a completed bar or indicia indicates that the message has been successfully and completely received and processed by the recipient's device.

Finally, at a later stage, the recipient may then read or play back the received message, once it has been processed. At that stage the recipient's mobile communication device may transmit a read acknowledgment to the provider service 50 and the provider service 50 may transmit a read notification 470 to the mobile communication device 100, as described with reference to FIG. 4. In response to receiving the read notification, the messaging application executing on the mobile communication device 100 may finally update the display of the message 500c to indicate that the message has been read by the recipient, as in the example of FIG. 8. In this example, the messaging application has updated the badge displayed with the message 500c to indicate that the message was read by the recipient. Again, it is not necessary that this graphical indicator of the status of the message at the recipient's device comprise letters or text; the indicator may be a different graphic design or symbol.

FIG. 9 depicts, with further detail, the correlation between the change in display at the sending mobile communication device (indicated as sending device 10 in FIG. 9) and processing of the message by various functional components of the receiving mobile communication device, including the receiving data consuming application 164r, notification agent 162r, encryption/decryption module (which may be provided in the trusted execution zone 150 of the processor 102, as described with reference to FIG. 2), and user interface. As described with reference to FIG. 4, when a message 400 is initially received by the provider service 50, initially the message as displayed to the user of the sender device 500c may be displayed with no status information, or only with status information showing that the message was successfully received by the provider service, as shown by badge 520. The provider service 50 triggers a push notification from the notification service 70 with the message ID of the message 400 to the receiving device 20. As shown in FIG. 9, this push notification 600 is received by the notification agent 162r on the receiving device 20.

The notification agent 162r relays 605 the notification data to the receiving application 164r. As discussed above, this may be a silent notification; the receiving application 164r may execute in the background to retrieve the new message 610. With the triggering of the push notification—or, alternatively, upon receiving confirmation from the notification service 70 that the push notification was successfully received by the receiving device 20—the provider service transmits a status update to the sending device 10, indicating an initial delivery status. The display on the sending device 10 may then be updated to reflect the new state of the message, for example with badge 530. Optionally, though, the receiving application 164r may trigger a notification 615 to be presented to the user of the receiving device 20, such as a visual notification in a graphical user interface 500 that a new message is available. This notification may invite the user to launch the receiving application 164r in the foreground, which will permit the application 164r to proceed with decryption of the message.

Once the message is received, the encrypted and/or signed content, as the case may be, is provided 620 to the encryption/decryption module (e.g., executing in the trusted execution zone 150) to validate or decrypt 625 the content. The result is returned 630 to the receiving application 164r for storage in the application's data store and for presentation to the user. The receiving application 164r at this point can transmit a delivery acknowledgment 635 to the provider service 50, which can then transmit the final delivery notification to the sending device 10. The sending application 164s on the sending device 10 can then update the display 500c of the message with badge 540 to show the final delivery status of the message. Finally, once the message is presented 640 to the user on the receiving device 20, the receiving application 164r can send a read acknowledgment 645 to the provider service 50, which then relays the read notification to the sending device 10. At this point, the sending application 164s can update the display 500c of the message with badge 550 to reflect the read status of the message.

It will be appreciated from the foregoing description that the delegation of initial notification to a notification service can provide faster acknowledgment to the sender of a message that the message will in fact be delivered to the recipient device, without requiring the recipient device to transmit additional status messages to the provider service. Furthermore, even though push notifications may be sent through a third-party service, the original message can remain secure and encrypted, since the message content is not included in the push notification.

The examples and embodiments are presented only by way of example and are not meant to limit the scope of the subject matter described herein. Variations of these examples and embodiments will be apparent to those in the art, and are considered to be within the scope of the subject matter described herein. For example, some steps or acts in a process or method may be reordered or omitted, and features and aspects described in respect of one embodiment may be incorporated into other described embodiments. The examples above were illustrated in an implementation employing a graphical user interface and touchscreen-based user input. However, those skilled in the art will appreciate that the systems and methods described above can also be implemented using other forms of user interfaces, such as audible interfaces employing aural presentation of data to the user, and receipt of voice-based commands from the user.

Accordingly, there is provided a method that may be implemented at a provider server system, the method comprising: receiving, from a sending mobile communication device, a message for transmission to a receiving mobile communication device provisioned with a data consuming application; determining, based on a current state of the data consuming application on the receiving mobile communication device, whether to send a push notification of the message to the receiving mobile communication device; on determining that the push notification is to be sent to the receiving mobile communication device, causing transmission of the push notification of the message to the receiving mobile communication device and transmitting an initial delivery notification to the sending mobile communication device; transmitting the message to the receiving mobile communication device; receiving, from the receiving mobile communication device, a confirmation that the message was successfully received; and after receiving the confirmation, transmitting a final delivery notification to the sending mobile communication device.

In one aspect, the provider server system associates the message with a message identifier, wherein the initial delivery notification, the message transmitted to the receiving mobile communication device, the confirmation, and the final delivery notification each comprise the message identifier.

In another aspect, the provider server system correlates the received confirmation with the message using the message identifier.

In another aspect, the method further comprises receiving an indicator of a current state of the data consuming application from the data consuming application while it is executing on the receiving mobile communication device; and storing the indicator in association with an identifier for receiving mobile communication device, wherein determining whether to send the push notification to the receiving mobile communication device comprises checking the indicator of the current state.

In still another aspect, receipt of the indicator of the current state occurs periodically while the data consuming application is executing in the foreground on the receiving mobile communication device.

In a further aspect, causing transmission of the push notification of the message to the receiving mobile communication device comprises transmitting, to a notification server system, an instruction to transmit the push notification to the receiving mobile communication device.

In another aspect, the notification server system is remote from the provider server system, and wherein transmitting the message to the receiving mobile communication device occurs without routing the message via the notification server system.

In still a further aspect, transmission of the push notification of the message to the receiving mobile communication device and transmitting the message to the receiving mobile communication device occur over distinct communication paths through a data communication network.

There is also provided a method that may be implemented at a mobile communication device, the method comprising: generating and transmitting a message to a provider server system, the message being destined for a recipient at a receiving mobile communication device; receiving, from the provider server system, an initial delivery notification; displaying an initial delivery indicator in a user interface in association with the message; receiving, from the provider server system, a final delivery notification; and displaying a final delivery indicator in the user interface in association with the message.

In one aspect, the method further comprises receiving, from the provider server system, a read notification; and displaying a read indicator in the user interface in association with the message.

There is also provided a method that may be implemented at a mobile communication device, the method comprising: receiving, from a notification server system, a push notification associated with a message; after receiving the push notification, receiving the message from a provider server system; processing the message; and after successfully processing the message, transmitting a receipt confirmation message to the provider server system.

In one aspect, the method further comprises presenting the message to a user of the mobile communication device; and after presenting the message, transmitting a read confirmation message to the provider server system.

In another aspect, processing the message may comprise decrypting the message and/or verifying a digital signature of the message.

In the foregoing aspects, the data consuming application may be a messaging (e.g., text message or MMS) application or social networking application, and the provider server system may be a messaging server system or a social networking system.

The foregoing methods and various aspects may be implemented by user communication devices such as mobile communication devices, or by server systems, as appropriate. Thus, the foregoing aspects also include computer or data processing systems comprising suitable hardware elements, such as processors, network communication interfaces, memories, and storage, adapted to implement the aspects recited above.

A data processing system may be configured to implement the foregoing methods and various aspects by program code stored on a suitable data processing system-readable medium, which is executed by the one or more processors of the system. Thus, the foregoing aspects also include non-transitory computer-readable media storing code which, when executed by one or more processors of a data processing system, cause the system to implement the methods and aspects described above.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. Any suggestion of substitutability of the electronic device for other implementation means should not be construed as an admission that the invention(s) described herein are abstract, or that the electronic device or its components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

The invention claimed is:

1. A system, comprising:
at least one network communications interface; and
at least one processor configured to:
receive, using the at least one communications interface, from a sending mobile communication device, a message for transmission to a receiving mobile communication device provisioned with a data consuming application;
determine, based on a current state of the data consuming application on the receiving mobile communication device, whether to send a push notification of the message to the receiving mobile communication device;

on determining that the push notification is to be sent to the receiving mobile communication device:

cause transmission of the push notification of the message to the receiving mobile communication device;

transmit, using the at least one communications interface, an initial delivery notification to the sending mobile communication device;

transmit, using the at least one communications interface, the message to the receiving mobile communication device;

receive, using the at least one communications interface, from the receiving mobile communication device, a confirmation that the message was successfully received;

after receiving the confirmation, transmit, using the at least one communications interface, a final delivery notification to the sending mobile communication device.

2. The system of claim 1, wherein the at least one processor is further configured to:

receive an indicator of a current state of the data consuming application from the data consuming application while it is executing on the receiving mobile communication device; and store the indicator in association with an identifier for receiving mobile communication device, and wherein the at least one processor is configured to determine whether to send the push notification to the receiving mobile communication device based on the indicator of the current state.

3. The system of claim 2, wherein the at least one processor is configured to receive the indicator of the current state periodically while the data consuming application is executing in the foreground on the receiving mobile communication device.

4. The system of claim 1, wherein the data consuming application is a messaging application and the provider server system is a messaging server system.

5. The system of claim 1, wherein the at least one processor is configured to cause transmission of the push notification of the message to the receiving mobile communication device by transmitting, to a notification server system, an instruction to transmit the push notification to the receiving mobile communication device.

6. The system of claim 5, wherein the notification server system is remote from the provider server system, and wherein the at least one processor is configured to transmit the message to the receiving mobile communication device without routing the message via the notification server system.

7. The system of claim 1, wherein transmission of the push notification of the message to the receiving mobile communication device and transmission of the message to the receiving mobile communication device occur over distinct communication paths through a data communication network.

8. A method implemented at a provider server system, comprising:

receiving, from a sending mobile communication device, a message for transmission to a receiving mobile communication device provisioned with a data consuming application;

determining, based on a current state of the data consuming application on the receiving mobile communication device, whether to send a push notification of the message to the receiving mobile communication device;

on determining that the push notification is to be sent to the receiving mobile communication device:

causing transmission of the push notification of the message to the receiving mobile communication device;

transmitting an initial delivery notification to the sending mobile communication device;

transmitting the message to the receiving mobile communication device;

receiving, from the receiving mobile communication device, a confirmation that the message was successfully received;

after receiving the confirmation, transmitting a final delivery notification to the sending mobile communication device.

9. The method of claim 8, further comprising:

receiving an indicator of a current state of the data consuming application from the data consuming application while it is executing on the receiving mobile communication device; and storing the indicator in association with an identifier for receiving mobile communication device, and wherein determining whether to send the push notification to the receiving mobile communication device comprises checking the indicator of the current state.

10. The method of claim 9, wherein receiving the indicator of the current state occurs periodically while the data consuming application is executing in the foreground on the receiving mobile communication device.

11. The method of claim 8, wherein the data consuming application is a messaging application and the provider server system is a messaging server system.

12. The method of claim 8, wherein causing transmission of the push notification of the message to the receiving mobile communication device comprises transmitting, to a notification server system, an instruction to transmit the push notification to the receiving mobile communication device.

13. The method of claim 12, wherein the notification server system is remote from the provider server system, and wherein transmitting the message to the receiving mobile communication device occurs without routing the message via the notification server system.

14. The method of claim 8, wherein transmission of the push notification of the message to the receiving mobile communication device and transmitting the message to the receiving mobile communication device occur over distinct communication paths through a data communication network.

15. A non-transitory computer readable medium bearing code which, when executed by one or more processors of a server system configures the server system to:

receive, using at least one communications interface, from a sending mobile communication device, a message for transmission to a receiving mobile communication device provisioned with a data consuming application;

determine, based on a current state of the data consuming application on the receiving mobile communication device, whether to send a push notification of the message to the receiving mobile communication device;

on determining that the push notification is to be sent to the receiving mobile communication device:
cause transmission of the push notification of the message to the receiving mobile communication device;
transmit, using the at least one communications interface, an initial delivery notification to the sending mobile communication device;
transmit, using the at least one communications interface, the message to the receiving mobile communication device;
receive, using the at least one communications interface, from the receiving mobile communication device, a confirmation that the message was successfully received;
after receiving the confirmation, transmit, using the at least one communications interface, a final delivery notification to the sending mobile communication device.

16. The non-transitory computer readable medium of claim 15, wherein the server system is further configured to:
receive an indicator of a current state of the data consuming application from the data consuming application while it is executing on the receiving mobile communication device; and
store the indicator in association with an identifier for receiving mobile communication device, and
wherein the server system is configured to whether to send the push notification to the receiving mobile communication device comprises checking the indicator of the current state.

17. The non-transitory computer readable medium of claim 16, wherein the server system is configured to receive the indicator of the current state periodically while the data consuming application is executing in the foreground on the receiving mobile communication device.

18. The non-transitory computer readable medium of claim 15, wherein the data consuming application is a messaging application and the provider server system is a messaging server system.

19. The non-transitory computer readable medium of claim 15, wherein the server system is configured to cause transmission of the push notification of the message to the receiving mobile communication device by transmitting, to a notification server system, an instruction to transmit the push notification to the receiving mobile communication device.

20. The non-transitory computer readable medium of claim 15, wherein transmission of the push notification of the message to the receiving mobile communication device and transmitting the message to the receiving mobile communication device occur over distinct communication paths through a data communication network.

* * * * *